United States Patent [19]
Scheuren

[11] Patent Number: 5,730,572
[45] Date of Patent: Mar. 24, 1998

[54] BALE HANDLING CARRIER

[76] Inventor: Duane L. Scheuren, 6246 F La., Bark River, Mich. 49807

[21] Appl. No.: 779,911

[22] Filed: Jan. 7, 1997

[51] Int. Cl.⁶ ............................................. A01D 90/02
[52] U.S. Cl. ................. 414/24.5; 414/789.7; 414/472; 414/481; 414/482; 414/486; 414/786; 414/911
[58] Field of Search ........................ 414/24.5, 789.7, 414/472, 481, 482, 483, 486, 786, 911

[56] References Cited

U.S. PATENT DOCUMENTS

| | | | |
|---|---|---|---|
| 3,877,595 | 4/1975 | Edelman | 214/506 |
| 4,194,863 | 3/1980 | Vansickle et al. | 414/24.5 |
| 4,297,065 | 10/1981 | Love | 414/24.5 |
| 4,329,101 | 5/1982 | Green et al. | 414/24.5 |
| 4,408,942 | 10/1983 | Butler et al. | 414/24.5 |
| 4,431,357 | 2/1984 | Butler | 414/24.5 |
| 4,459,075 | 7/1984 | Eichenberger | 414/24.5 |
| 4,573,845 | 3/1986 | Carpenter | 414/24.5 |
| 4,578,008 | 3/1986 | Gleason | 414/24.5 |
| 4,687,402 | 8/1987 | Zatylny | 414/24.6 |
| 4,718,806 | 1/1988 | Chambers | 414/24.5 |
| 4,909,694 | 3/1990 | Peters et al. | 414/24.5 |
| 5,013,202 | 5/1991 | Love | 414/24.5 |
| 5,082,413 | 1/1992 | Grosz et al. | 414/24.5 |
| 5,211,345 | 5/1993 | Siebenga | 414/24.5 |
| 5,316,426 | 5/1994 | Dwyer et al. | 414/24.5 |
| 5,333,981 | 8/1994 | Pronovost et al. | 414/789.7 |
| 5,340,259 | 8/1994 | Flaskey | 414/24.5 |
| 5,362,189 | 11/1994 | Lindahl | 414/24.5 |
| 5,405,229 | 4/1995 | Tilley et al. | 414/789.7 |

*Primary Examiner*—Karen B. Merritt
*Assistant Examiner*—Douglas Hess
*Attorney, Agent, or Firm*—Andrus, Sceales, Starke & Sawall

[57] ABSTRACT

A carrier adapted to be drawn over the ground for handling and transporting bales of hay comprises a rigid framework assembly adapted to be connected to a towing vehicle for transporting a series of bales in side-to-side relationship substantially along the entire length thereof. A bale engaging structure is pivotally attached to the framework assembly about a first horizontal axis for lifting the bales from the ground to the framework assembly. The bale engaging structure is also slidably mounted to the framework assembly along a second horizontal axis substantially parallel to the first horizontal axis for engaging the ends of the bales. An alignment arrangement is constructed and arranged to shift the framework assembly without moving the towing vehicle so as to align the bale engaging structure with the ends of the bale before the bale engaging structure engages the bales on the ground.

17 Claims, 6 Drawing Sheets

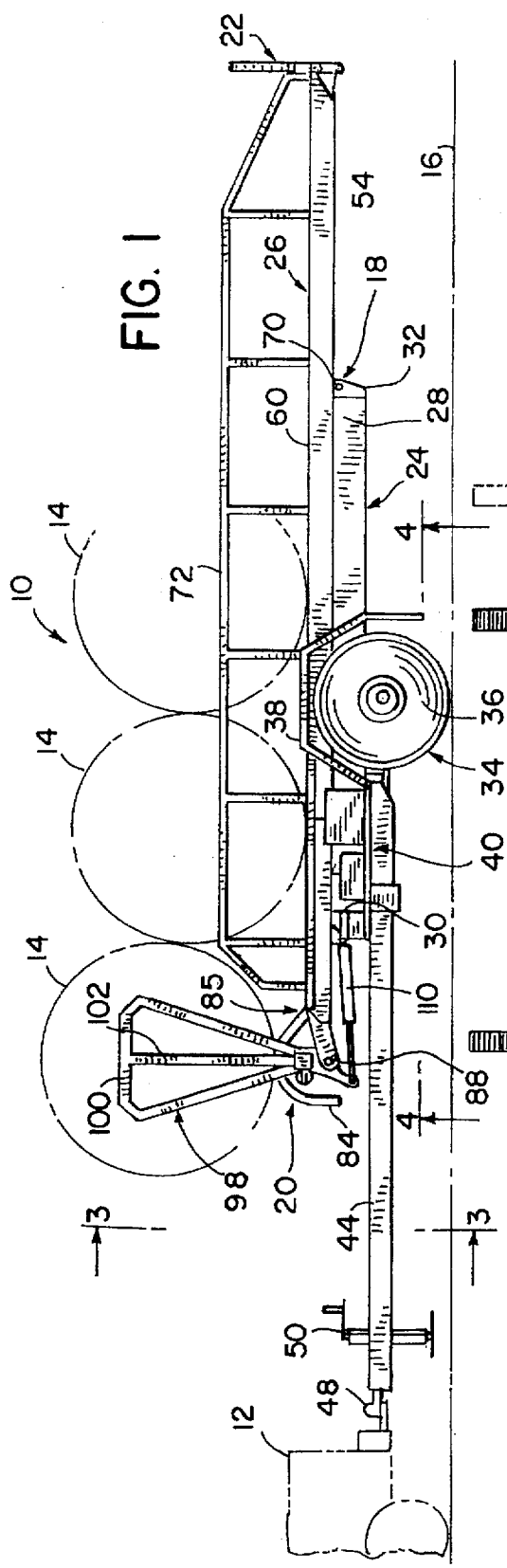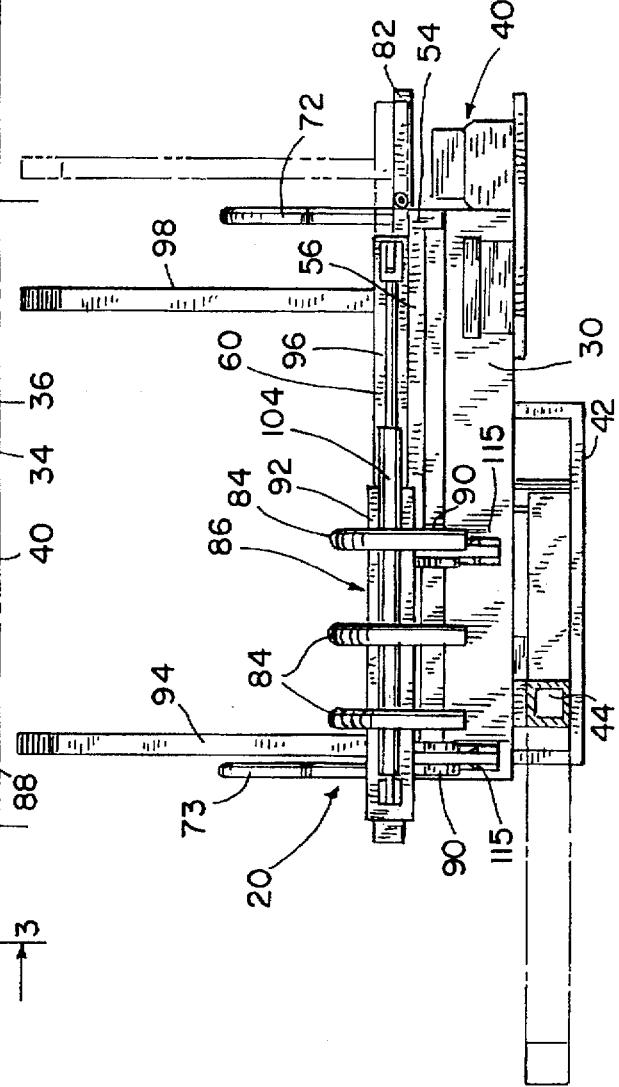

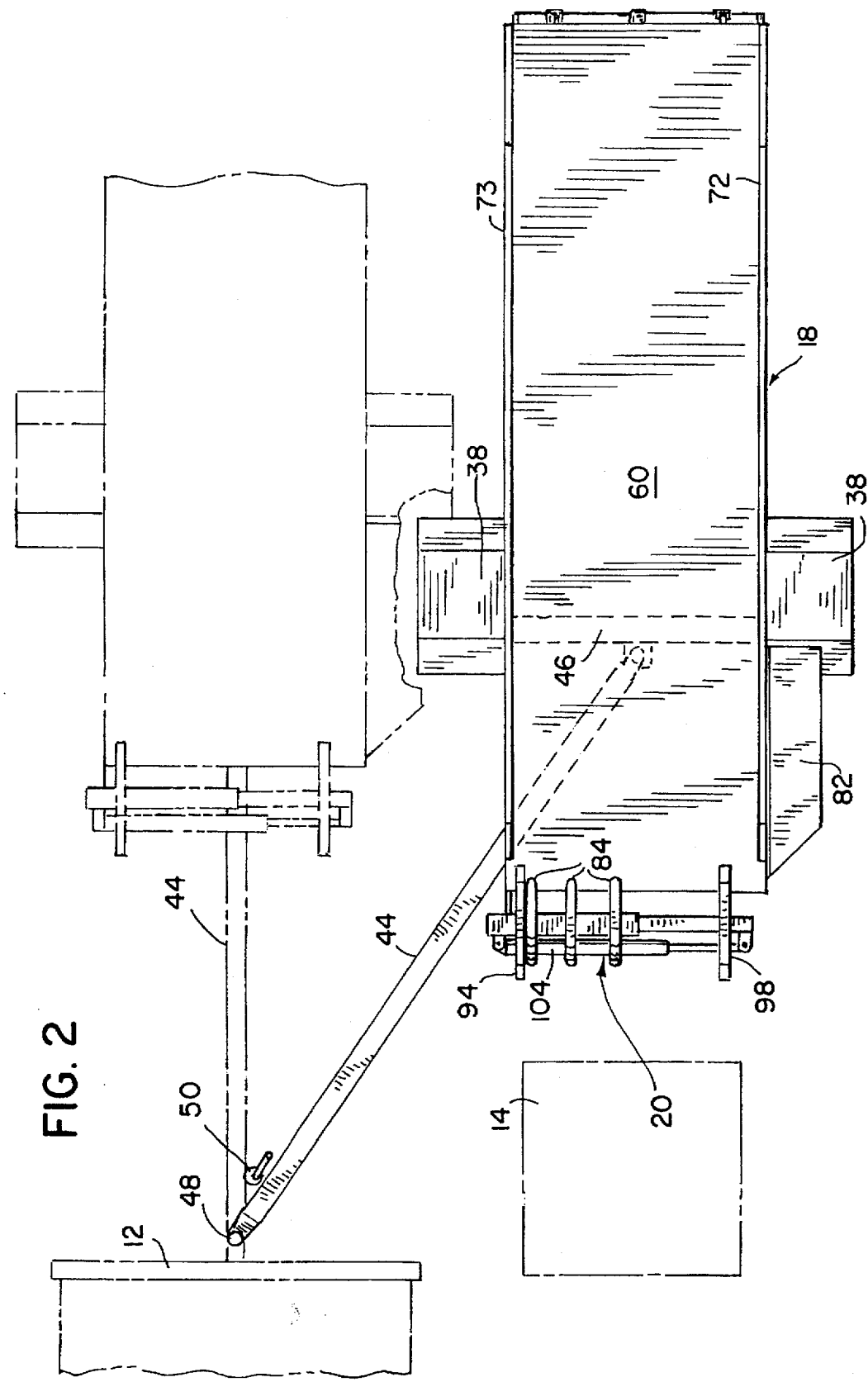

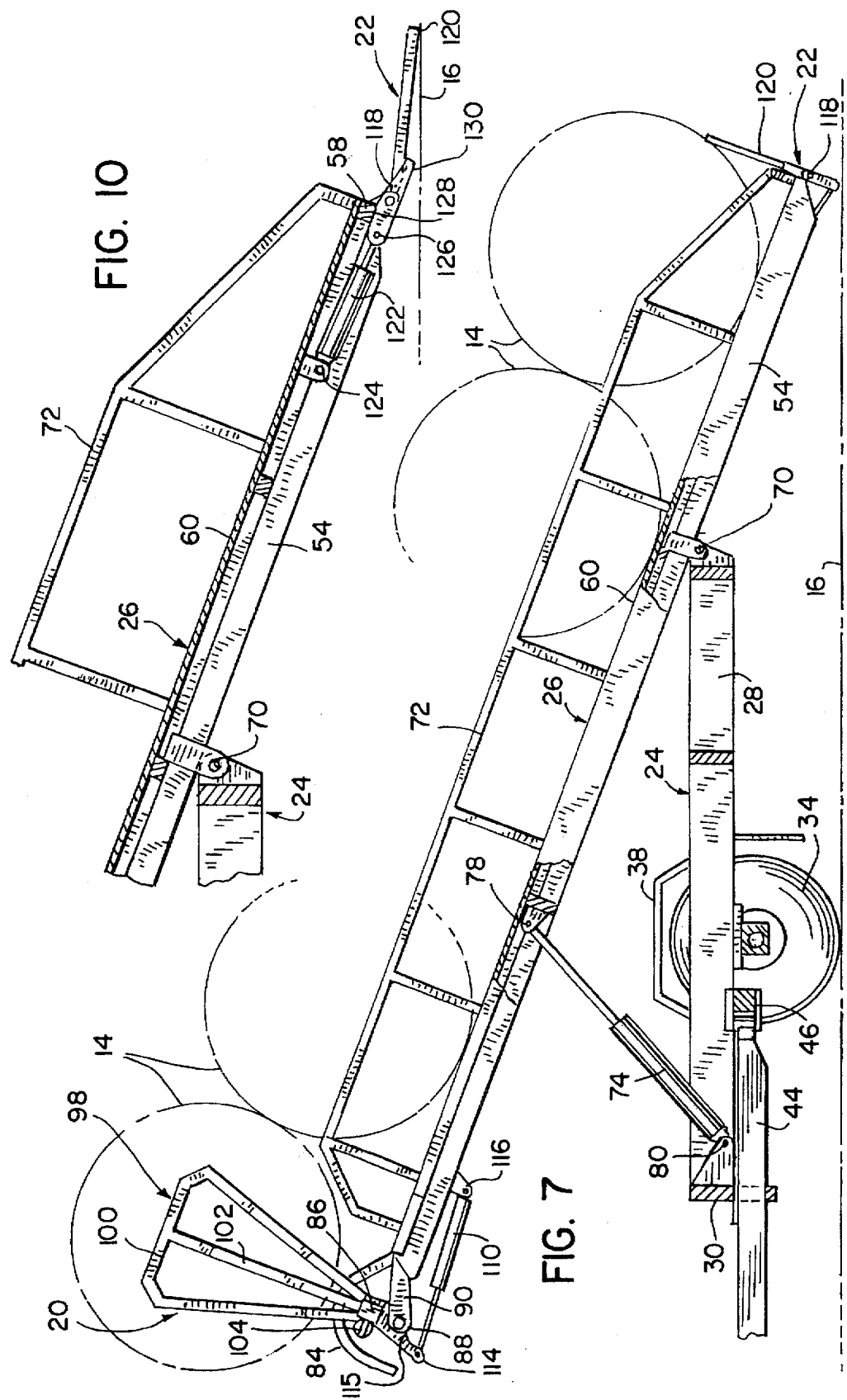

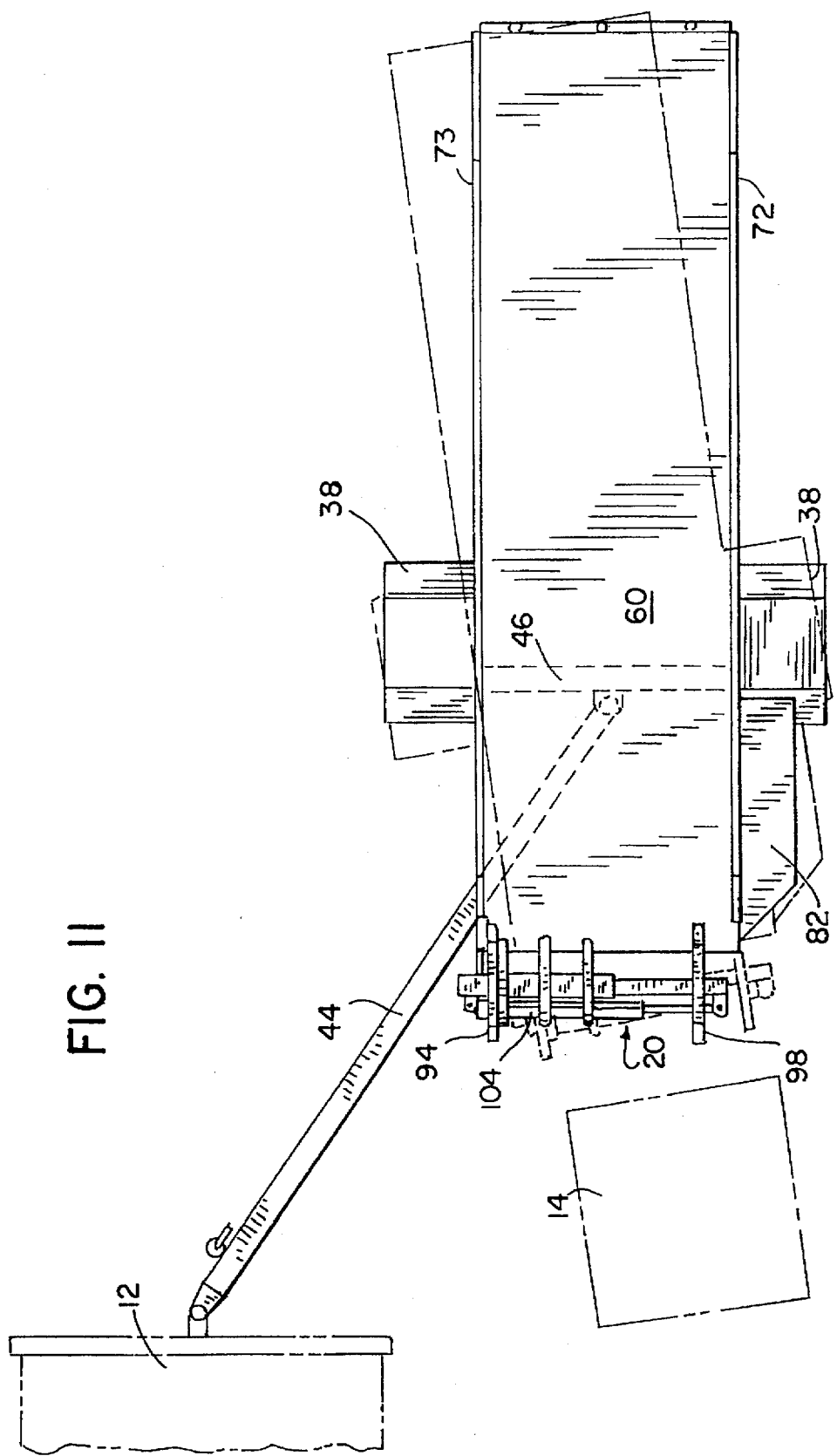

BALE HANDLING CARRIER

FIELD OF THE INVENTION

This invention relates generally to a carrier for handling round bales of hay and the like, and more particularly, pertains to a carrier adapted to be towed by a vehicle, such as a pick-up truck, for lifting, conveying and unloading round bales of hay at a predetermined site.

BACKGROUND OF THE INVENTION

In recent years, automated hay baling equipment has been employed to form and bind bales of hay in a cylindrical or round shape. Such bales are relatively large and heavy, ranging in diameter from 4 feet to 8 feet and weighing anywhere from 800 lbs. to approximately 1500 lbs. These bales possess significant advantages over the more conventional rectangular-shaped bales. For example, a large, round or cylindrical hay bale may be the equivalent of at least 20 rectangular bales. Further, cylindrical bales can be stored outside for a prolonged period, if necessary, without suffering adverse consequences. Due to their round formation, these bales shed water, and as such, do not rot as rectangular bales do when left in the field. Generally, these round bales, after they are formed in the field, are left lying on their sides on the ground and subsequently, must be picked up and hauled away for storage and livestock feedings. Because of their overburdening size, however, they are too large and heavy for being handled manually and typically require machine handling.

The agricultural art is replete with various types of powered equipment for handling and transporting round or cylindrical bales. One well known type of equipment is characterized by a wheeled carrier having a bale pick-up structure which has two operable functions, to clamp or squeeze a bale between the projecting gripping arms and to elevate or load the engaged bale onto the vehicle. Certain of these carriers are restricted to retrieving and transporting a single bale of hay and, if tractor drawn, are further limited by tractor speed and maneuverability. Other carriers used to handle multiple bales of hay operate with inferior bale clamping mechanisms, complex linkages and complicated fluid power systems to lift the bales in a manner which is sometimes uneven or unstable and dangerous because of the tremendous size of the bales. Once the bales have been lifted from the ground, some carriers require various auxiliary conveying devices to load the bales onto the carrier. In addition, the loading techniques used in connection with some of these carriers make it difficult to align or center the bales on the pick-up structure with the result that such imprecise positioning tends to slow bale handling.

It is evident that there remains an unresolved need in the prior art for a hay bale carrier which is readily attachable to a towing vehicle such as a conventional pick-up truck and suitable for elevating, depositing and transporting multiple bales of hay. A hay bale carrier has been needed that provides sufficient stability and strength to transfer a hay bale safely without the danger of the bale falling from the bale pick-up structure. Further, a hay bale carrier has been required that efficiently centers or aligns bales on the bale pick-up structure to allow relatively rapid bale handling.

Accordingly, it is desirable to provide an improved bale handling carrier having a simplified bale engaging structure which will ensure continuous, even and safe loading and unloading of bales, irregardless of size or condition. It is also desirable to provide a bale handling carrier employing a bale pick-up structure having gripping jaws which are relatively adjustable and maintained in parallel relationship with one another so that the bales can be securely clamped and moved between the field and the carrier. It is further desirable to provide a bale handling carrier which compensates for any uneven positioning of a bale lying in a field by shifting the carrier to center the bale properly relative to the bale pick-up structure. Moreover, it is desirable to provide a method of depositing multiple bales of hay on a bale handling carrier using only the pick-up structure without the need for additional loading or handling equipment.

BRIEF SUMMARY OF THE INVENTION

The present invention advantageously provides an improved bale pick-up, loading, transporting and unloading carrier for handling multiple bales of various sizes and weights.

It is one object of the present invention to provide a relatively simple and economical bale carrier which is capable of operating in a safe, smooth and even manner.

It is another object of the present invention to provide a bale handling carrier having an alignment arrangement for aligning the bales to be engaged by the bale pick-up structure.

It is a further object of the present invention to provide a bale handling carrier which operates in an offset relationship relative to the rearward end of a towing vehicle.

It is yet another object of the present invention to provide a bale handling device having an improved pick-up structure.

Still yet another object of the present invention is to provide a method of using a bale handling carrier in which a subsequent bale retrieved by the pick-up structure is effectively used to sequentially push an initial bale deposited on the carrier into an advanced loading position on the carrier.

These and other objects, advantages and features are realized in one aspect of the invention by a carrier adapted to be drawn over the ground for handling and transporting bales of hay. The carrier includes a rigid framework assembly adapted to be connected to a towing vehicle for supporting a series of bales in side-to-side relationship substantially along the entire length thereof. A bale engaging structure is pivotally attached to the framework assembly about a first horizontal axis for lifting the bales from the ground to the framework assembly. The bale engaging structure is slidably mounted along a second horizontal axis substantially parallel to the first horizontal axis for engaging the ends of the bales. An alignment arrangement is constructed and arranged to shift the framework assembly without moving the towing vehicle so as to align the bale engaging structure with the ends of the bale before the bale engaging structure engages the bales on the ground. The framework assembly comprises a lower frame having a forward end adapted to be connected to the towing vehicle, a rearward end defining a third horizontal axis, and a wheel and axle assembly on each side thereof. The framework assembly further comprises an upper frame overlying the lower frame, and pivotally connected to the lower frame along the third horizontal axis, the upper frame having a forward end and a rearward end. The bale engaging structure is pivotally attached to the forward end of the upper frame about the first horizontal axis which is substantially parallel to the third horizontal axis. The bale engaging structure includes a carriage having a pair of parallel, spaced apart gripping jaws, one of the gripping jaws being movably mounted relative to the other of the gripping jaws. The alignment arrangement is mounted on the lower frame for shifting the upper frame and the lower frame so as to align the gripping jaws generally parallel with the ends of the bale before the gripping jaws engage the bales on the ground. The alignment arrangement includes a tongue having one end pivotally connected to the towing vehicle and another end pivotally connected to the lower frame. The alignment arrangement further includes a first power assembly having one end connected to the lower frame and another end connected to the tongue. The carrier includes a second power assembly for pivotally mounting the gripping jaws about the first horizontal axis, and a third power assembly for slidably moving one of the gripping jaws along the second horizontal axis so as to squeeze the bale from both ends for loading onto the carrier. The carrier further includes a fourth power assembly for raising and lowering the upper frame about the third horizontal axis relative to the lower frame. The upper frame has a length longer than the length of the lower frame and an extended portion of the upper frame projects beyond the third horizontal axis. A bale restraining apparatus is mounted at the rearward end of the framework assembly.

In another aspect of the invention, a bale carrier for picking up round bales of crop material from a field, accumulating a plurality of round bales and transporting the accumulated bales to a storage location to be unloaded from the bale carrier has a frame adapted to be connected to a towing vehicle for movement across the field. A load bed is pivotally supported on the frame for accumulating a series of bales in side-to-side relationship thereon. Bale pick-up structure is mounted on the frame for individually engaging bales of crop material lying in the field and elevating the bales onto the carrier. The load bed has a receiving portion on which the bale pick-up structure sequentially deposits bales picked up from the field. An improved bale pick-up structure comprises a carriage pivotally secured to the load bed and including a pair of parallel, spaced apart gripping jaws. The carriage further includes a first tubular member on which one of the parallel gripping jaws is mounted, and a second tubular member telescopically mounted with respect to the first tubular member and carrying the other of the parallel gripping jaws. A first hydraulic power system is mounted between the first tubular member and the second tubular member for independently moving one of the parallel gripping jaws toward and away from the other of the parallel gripping jaws to releasably engage the ends of a bale of crop material therebetween. A second hydraulic power system connects the frame and the first tubular member for independently pivoting the parallel gripping jaws in substantially vertical planes to lift a bale of crop material engaged between the parallel gripping jaws from the field to a position on the receiving portion of the load bed. The bale pick-up structure includes a bale centering arrangement associated with the frame for aligning each of the parallel gripping jaws in parallel relationship with an end of the bale of crop material before moving the parallel gripping jaws into engagement with the ends of the bale. The bale centering arrangement comprises a tongue connecting the towing vehicle with the frame, and a third hydraulic power system interconnecting the frame and the tongue for shifting the parallel gripping jaws into substantially parallel alignment with the ends of the bale. A fourth hydraulic power system extends between the frame and the load bed for pivoting the load bed relative to the frame so as to dump the bales on the load bed back onto the field. A bale restraining apparatus is provided on the load bed for selectively holding bales on the load bed. A fifth hydraulic power system is disposed on the load bed for moving the bale restraining apparatus between an upright, retaining position and a collapsed, release position. The bale restraining structure comprises at least one stake pivotally mounted to a rearwardmost end of the load bed, the stake being deflectable against the surface of the field. A pair of parallel, spaced apart side railings extend upwardly from the load bed for restraining the ends of bales deposited on the load bed.

In yet another aspect of the invention, a carrier adapted to be drawn over the ground for handling and transporting bales of hay comprises a rigid lower frame having a forward end adapted to be connected to a towing vehicle, a rearward end defining a first horizontal axis, and a wheel assembly mounted on each side thereof. A rigid upper frame overlies the lower frame and is pivotally connected thereto along a first horizontal axis. The upper frame has a forward end and a rearward end for supporting a series of bales in side-to-side relationship substantially along the entire length thereof. A bale engaging structure is pivotally attached to the forward end of the upper frame about a second horizontal axis substantially parallel to the first horizontal axis for lifting bales from the ground to the uppermost frame. The bale engaging structure also is slidably mounted along a third horizontal axis parallel to the first and second horizontal axes for engaging the ends of the bale. An alignment arrangement is mounted on the lower frame for shifting the lower frame and the upper frame so as to orient the bale engaging structure generally parallel with the sides of the bale before the bale engaging structure engages the bales.

Yet another aspect of the invention resides in a method of using a carrier adapted to be drawn over the ground for handling and transporting bales of hay lying in a field wherein the carrier comprises a rigid framework assembly adapted to be connected to a towing vehicle for supporting a series of bales in side-to-side relationship substantially along the entire length thereof. A bale engaging structure is movably mounted to the framework assembly for engaging and lifting the bales from the ground to a receiving portion of the framework assembly. The method comprises the steps of:

a) moving the bale engaging structure into engagement with an initial bale on the ground;

b) lifting the bale engaging structure with the initial bale engaged therewith to the receiving portion of the framework assembly;

c) releasing the initial bale from the bale engaging structure to deposit the initial bale onto the receiving portion of the framework assembly;

d) moving the bale engaging structure into engagement with a subsequent bale on the ground; and e) lifting the bale engaging structure with the subsequent bale engaged therewith against a forward facing portion of the initial bale which is pushed rearwardly on the framework assembly until the subsequent bale is positioned over the receiving portion of the framework assembly.

In still another aspect of the invention, there is contemplated a method of using a bale carrier for picking up round bales of crop material from the field, accumulating a plurality of round bales and transporting the accumulated bales to a storage location to be unloaded from the bale carrier, in which the bale carrier has a mobile frame adapted to be connected to a towing vehicle for movement across the field, bale pick-up structure mounted on the frame for individually engaging bales of crop material lying in the field and elevating the bales onto the carrier, a load bed pivotally supported on the frame for accumulating a series of bales in side-to-side relationship thereon, the load bed having a receiving portion on which the bale pick-up structure sequentially deposits bales picked up from the field, and a bale restraining apparatus for maintaining loaded bales on the load bed. The method comprises the steps of:

a) providing the bale pick-up structure with a carriage rotatably secured to the load bed and including a pair of parallel, spaced apart gripping jaws engageable with the ends of a bale, one of the gripping jaws being movable and maintained in parallel relationship towards and away from the other of the gripping jaws so as to squeeze the bale therebetween;

b) moving the carrier to align an initial bale between the parallel gripping jaws;

c) rotating the carriage to position the parallel gripping jaws alongside the ends of the initial bale;

d) moving one of the parallel gripping jaws towards the other of the parallel gripping jaws to squeeze the initial bale therebetween;

e) rotating the carrier to lift the initial bale engaged between the parallel gripping jaws from the field to the receiving portion of the load bed;

f) further moving the carrier to align a subsequent bale between the parallel gripping jaws;

g) moving the parallel gripping jaws apart to release the initial bale onto the load bed;

h) rotating the carriage from the load bed to the field to place the parallel gripping jaws alongside the ends of the subsequent bale;

i) moving the parallel gripping jaws together to engage the subsequent bale therebetween;

j) rotating the carriage to lift the subsequent bale engaged between the parallel gripping jaws from the field against a forward facing portion of the initial bale which is pushed rearwardly on the load bed until the subsequent bale is positioned over the receiving portion of the load bed; and k) repeating steps a) through j) for subsequent bales in the field until the initial bale contacts the bale restraining apparatus on the load bed. The step of aligning the initial and subsequent bales between the parallel gripping jaws includes the step of shifting the frame and the load bed without moving the towing vehicle so as to initially align the parallel gripping jaws with the ends of the bale before the parallel gripping jaws engage the bales. The method described above further includes the steps of:

l) disengaging the bale restraining apparatus from the initial bale; and m) pivoting the load bed upon the frame so as to unload the bales deposited on the load bed.

Various other objects, features and advantages of the invention will be made apparent from the following description taken together with the drawings.

BRIEF DESCRIPTION OF THE SEVERAL VIEWS OF THE DRAWING

The drawings illustrate the best mode presently contemplated of carrying out the invention. In the drawings:

FIG. 1 is a side view of the bale handling carrier embodying the present invention;

FIG. 2 is a top view of the bale handling carrier shown in FIG. 1;

FIG. 3 is a cross-sectional view taken on line 2—2 of FIG. 1;

FIG. 7 is a side view in partial cross-section of the bale handling carrier showing the unloading of multiple bales of hay;

FIG. 10 is a partial side view in partial cross-section of the bale handling carrier in the unloading position of FIG. 7, but showing the bale restraining apparatus in its collapsed, release position with respect to a ground or field surface; and FIG. 11 is a view similar to FIG. 2 showing the use of an alignment arrangement for centering a non-aligned bale positioned in front of the bale handling carrier.

DETAILED DESCRIPTION OF THE INVENTION

Figure 4:
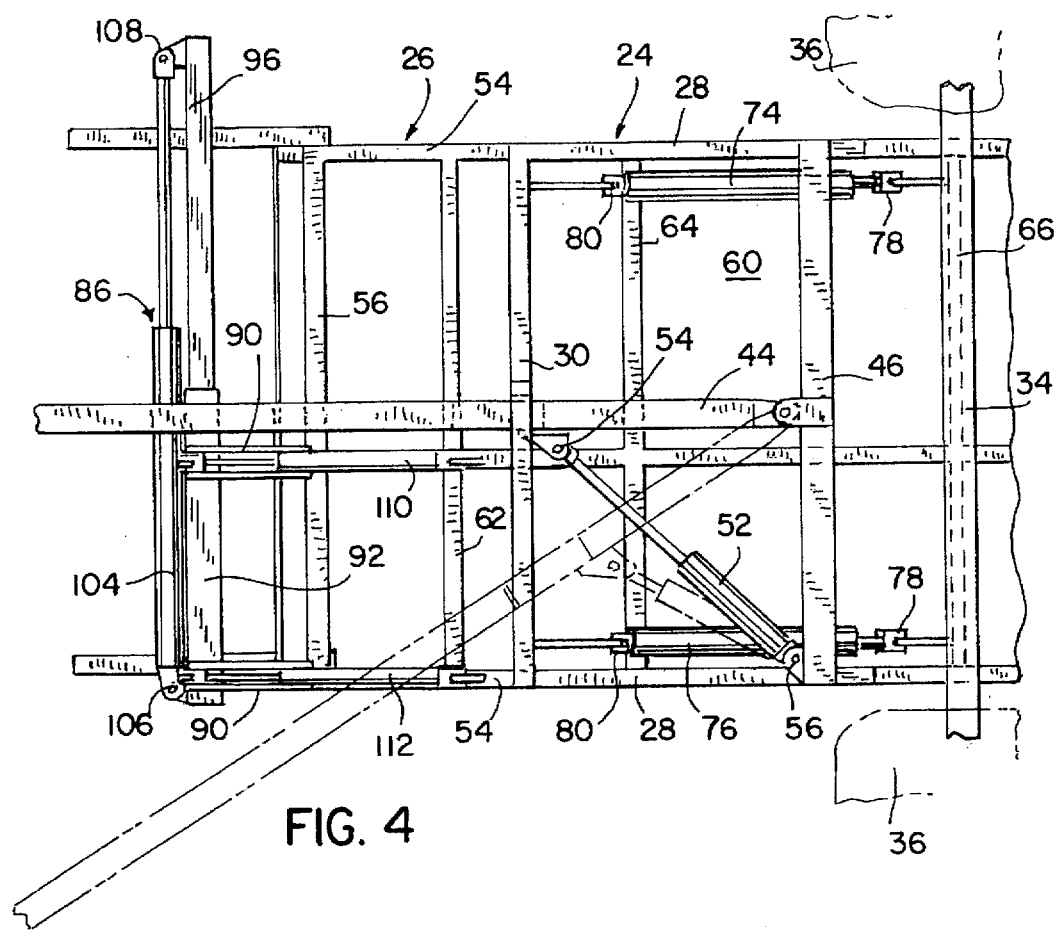
FIG. 4 is a fragmentary bottom view of the bale handling carrier taken on line 4—4 of FIG. 1.

Referring now to FIGS. 1–4, the bale handling carrier 10 of the present invention is an agricultural implement adapted to be hitched to a towing vehicle 12 for handling large round or cylindrical bales 14 of harvested hay lying on their sides on a farm field or ground surface 16, and for transporting the bales 14 to an unloading site. In the preferred embodiment, the towing vehicle 12 is depicted as a conventional pick-up truck to emphasize that a tractor which is normally used in the farm environment is free to perform other tractor-desired agricultural tasks. Carrier 10 is a trailer-like construction suitably comprised of a rigid framework assembly 18, a bale pick-up and engaging structure 20, and a bale restraining apparatus 22, all of which will be described in further detail hereafter.

Framework assembly 18 is formed of two major components, a lower frame 24 and an upper frame 26. The lower frame 24 includes a pair of elongated, parallel side girders 28 interconnected by a first transverse cross-girder 30 at a forward end and a second transverse cross-girder 32 at a rearward end. Side girders 28 and cross-girders 30, 32 are preferably welded together and fabricated from metal beams or the like designed to bear the bale weight without deformation. The lower frame 24 is equipped with a wheel and axle assembly 34 to enable conveyance over the ground or field surface 16. The wheel and axle assembly 34 provides one wheel 36 on each side of the carrier 10 and each of the wheels 36 is protectively shielded by a heavy duty fender 38 attached to the lower frame 24. As seen in FIGS. 1 and 3, the lower frame 24 supports a hydraulic power station having the normal hydraulic constituents such as valves, controllers, a pump, a reservoir and the like for enabling a series of fluid power systems which are remotely controlled by an operator in the towing vehicle 12.

Depending from the lower frame 24 is a channel-like frame 42 for supporting a straight, elongated one-piece tongue 44 used to swingably connect the carrier 10 behind the towing vehicle 12. The tongue 44 has a rearward end which is pivotally connected to a stabilizing brace 46 extending transversely across the side girders 28. The tongue 44 also has a forward end which is removably and pivotally coupled to the towing vehicle 12 by a suitable hitch device 48. A conventional parking jack 50 is secured near the forward end of the tongue 44 to support the carrier 10 when it is detached from the towing vehicle 12. As best seen in FIG. 4, a hydraulic cylinder 52 has a piston end 54 pivotally connected to a link on the tongue 44, and a cylinder end 56 which is pivotally joined to the brace 46. The hydraulic cylinder 52 is suitably connected by hoses to the hydraulic power station 40 so that extension and retraction of the cylinder 52 will swing the connected carrier 10 between positions directly behind the towing vehicle 12 (as shown in phantom in FIG. 2) and angularly offset behind and to the left side of the towing vehicle 12. The hydraulic cylinder 52 and tongue 44 define a unique alignment arrangement which is advantageously employed to reorient or shift the carrier 10 relative to misaligned or misshapen bales 14 before they are engaged by the bale pick-up and engaging structure 20. The manner in which this alignment arrangement is used will be described in the operation portion of this description.

Figure 5:
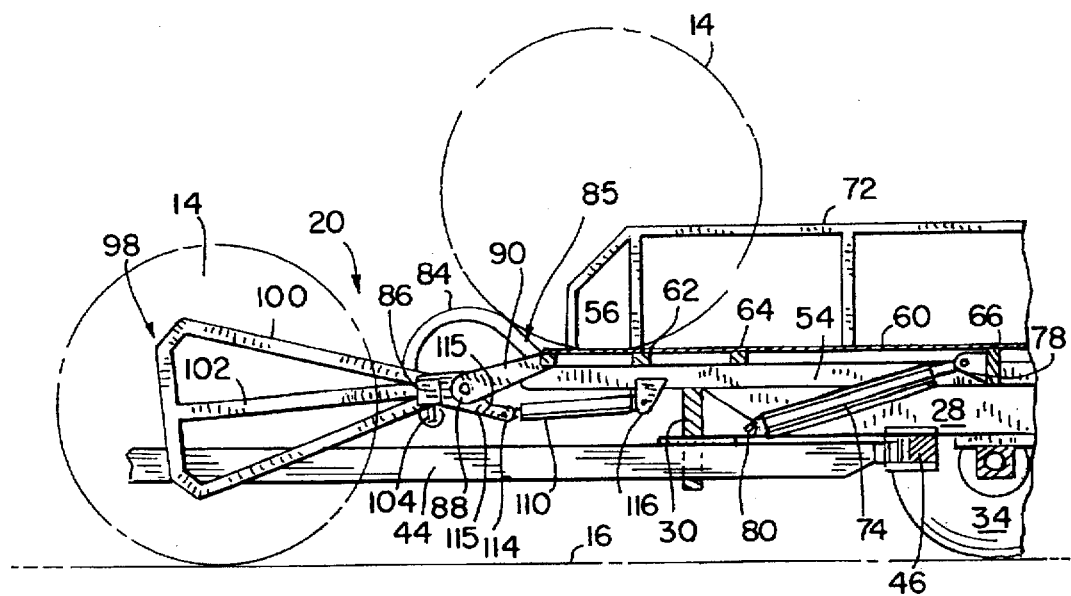
FIGS. 5 and 6 are fragmentary partial side views of the bale handling carrier showing the loading of multiple bales of hay.
Figure 8:
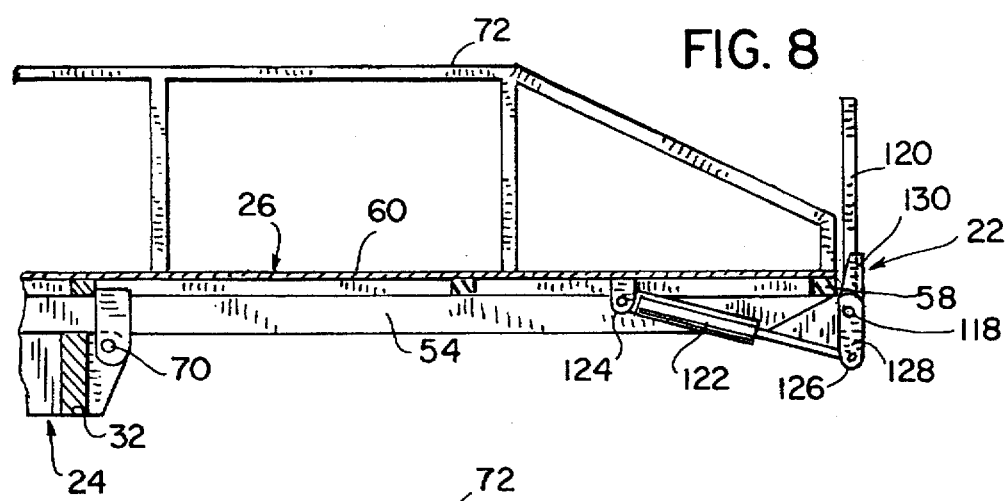
FIG. 8 is a partial side view in partial cross-section of a bale restraining apparatus in an upright, retaining position.
Figure 9:
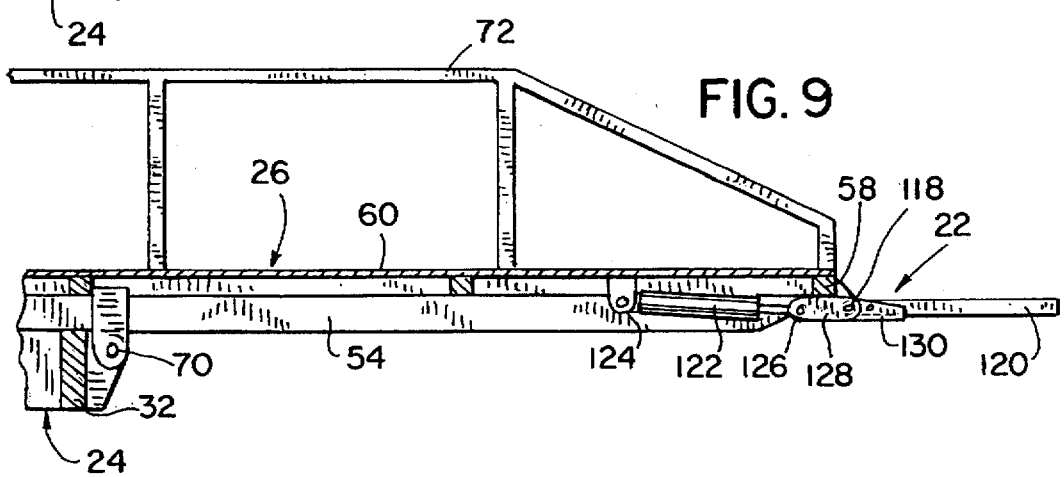
FIG. 9 is a view similar to FIG. 8 showing the bale restraining apparatus in a collapsed, release position.

The upper frame 26 has two side rails 54 which chiefly support the main structure, and they extend beyond the length of lower frame side girders 28 from a forward end where they are attached together by a cross-member 56 to a rearward end where they are connected by another cross-member 58 (FIGS. 8–10). A flat load bed 60 is supported by the side rails 54 and the cross-members 56, 58 as well as by a series of transversely extending, spaced apart cross-braces 62, 64, 66 and a longitudinally extending reinforcing beam 68 (FIGS. 4 and 5). Again, the components of upper frame 26 are fashioned of rigid metal which will easily sustain the stresses of the weighty bales 14. The load bed 60 is pivotally mounted to the lower frame 24 about a horizontal pivot axis 70 located on the rearward end thereof. A pair of upstanding, parallel side railings 72, 73 engageable with the bale ends is provided on the load bed 60 to prevent the bales 14 from falling off the sides of the carrier 10 during loading, transport and unloading operations. A pair of hydraulic cylinders 74, 76 suitably connected to the hydraulic power station 40 operatively interconnect the lower frame 24 and the load bed 60 of the upper frame 26 to selectively effect a pivotal movement of the load bed 60 relative to the lower frame 24. This moves the forward end of the load bed 60 above the lower frame 24 and the rearward end closer to the ground 16 for the discharging of bales 14 from the load bed 60, as illustrated in FIG. 7. Each of the cylinders 74, 76 has a piston end 78 connected to a link on the load bed 60 and a cylinder end 80 attached to a link on the cross-girder 30 on the forward end of the lower frame 24. As depicted in FIGS. 2 and 3, a skirt 82 is pivotally connected to and suitably held suspended from the left side girder 28 of upper frame 26 to partially cover the hydraulic power station 40 from the top. The hydraulic power station 40 remains visible and accessible from the front and side at all times, and is further accessible from the top by simply pivoting the skirt 82 upwardly against the left side railing 72.

The forward end of load bed 60 includes three spaced apart, curved roll bars 84 over which each engaged bale 14 may be rolled and supported such as from the bale pick-up and engaging structure 20 before the bale 14 is deposited on the forward end of the load bed 60. Together the forward end of the load bed 60 and the roll bars 84 defining a receiving portion 85 for accommodating each bale 14 lifted from the field 16. It will be appreciated from FIG. 5 and further discussion that the curved roll bars 84 prevent a bale 14 which has been deposited on the load bed 60 from rolling forwardly off the forward end of the load bed 60. In addition, it will be appreciated that the curved roll bars 84 also serve to protect a portion of the bale pick-up and engaging structure 20.

The bale pick-up and engaging structure 20 includes a carriage 86 which is pivotally mounted upon a horizontal axis 88 on an outer end of a pair of link assemblies 90 extending forwardly from the upper frame 26 adjacent the forward end of the load bed 60. Axis 88 extends substantially parallel to the axis 70 pivotally connecting the upper frame 26 with the lower frame 24. Referring to FIGS. 3 and 4, the carriage 86 includes a first tubular member 92 carrying a first bale-engaging gripping jaw 94, and a second tubular member 96 carrying a second bale-engaging gripping jaw 98 which is spaced apart from and maintained in parallel relationship to the first gripping jaw 94. Second tubular member 96 is telescopically mounted relative to first tubular member 92 so as to vary the distance between the gripping jaws 94, 98 to accommodate and squeeze the ends of various sized bales 14. Each of the gripping jaws 94, 98 has a planar framework having a pentagonal periphery 100 with a central reinforcing member 102 dimensioned so as to extend inwardly from the periphery of a round bale 14 a distance at least as long as a radius on the end surfaces of a cylindrical bale 14. In this manner, the gripping jaws 94, 98 grasp a major surface area on the end surfaces of the heavy bales 14 so as to improve the holding strength thereon. The back and forth movement of the gripping jaw 98 relative to the other gripping jaw 94 is enabled by single hydraulic cylinder connected with the hydraulic power station 40 and having a cylinder end 106 connected to the first tubular member 92 and a piston end 108 joined to the second tubular member 96. The hydraulic cylinder 104 has a horizontal, longitudinal axis substantially parallel to the horizontal axes 70, 88 along which the gripping jaws 94, 98 slide.

Figure 6:
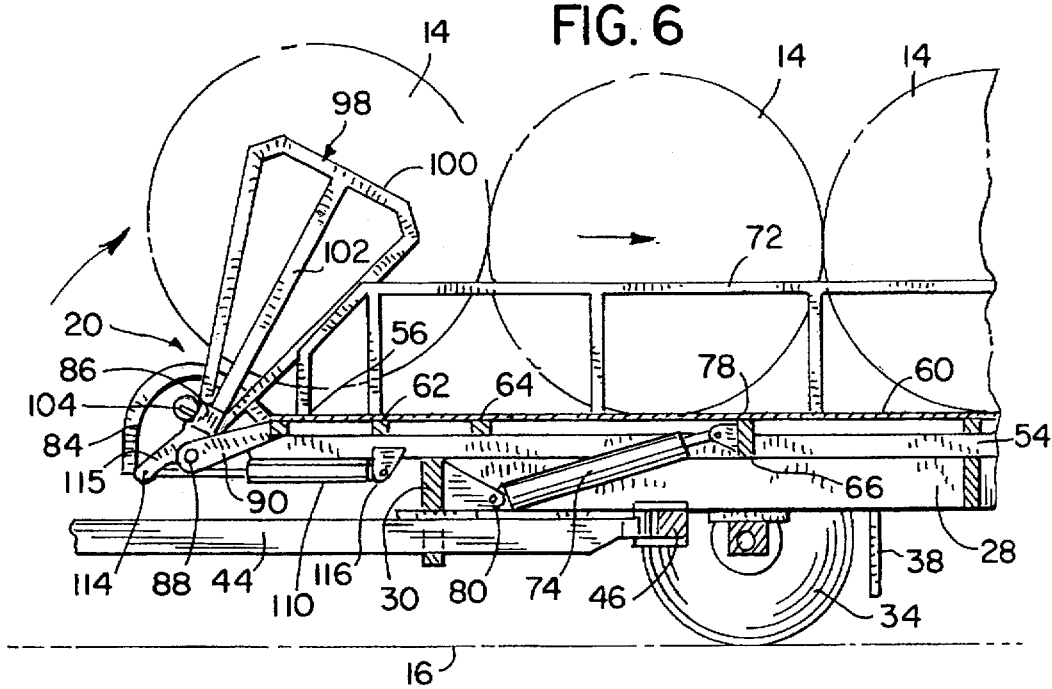

A pair of hydraulic cylinders 110, 112 connected with the hydraulic power station 40 interconnect the carriage 86 with the upper frame 26 for pivotally moving the bale pick-up and engaging structure 20 between a pick-up position shown in FIG. 5 in which a bale 14 is engaged between the gripping jaws 94, 98 while lying on the ground 16, and a loading position shown in FIGS. 1 and 6 in which the bale pick-up and engaging structure 20 moves an engaged bale 14 towards a receiving portion 85 on the load bed 60. Each of the cylinders 110, 112 has a piston end 114 pivotally connected to an extension on carriage 86 and a cylinder end 116 pivotally connected to a link depending from upper frame 26. The hydraulic cylinder 104 and the hydraulic cylinders 110, 112 are separately operable to effect the desired pivoting or sliding motion of the gripping jaws 94, 98. It is to be noted that the link assemblies 90 define lever arms dimensioned so that the bales 14 can be lifted relatively close to the carrier 10 thereby enabling a safer more stable lifting action. As previously mentioned and shown in FIG. 3, the carriage 86 and the hydraulic cylinder 104 are protected from the heavy bales to be loaded by the roll bars 84 over which the bales are lifted as will be described in more detail.

At the rearwardmost end of the load bed 60, such as illustrated in FIGS. 8–10, the bale restraining apparatus 22 is pivotally connected along a horizontal axis 118. As seen in the top view of FIG. 2, the bale restraining apparatus 22 comprises preferably three spaced apart elongated stakes 120 but could also be embodied in other forms such as a simple tailgate assembly. A hydraulic cylinder 122 connected to hydraulic power station 40 is connected between the load bed 60 and one of the stakes 120 and is operable to move the stake 120 between an upright position shown in FIGS. 7 and 8 wherein the loaded bales 14 bare prevented from rolling off the load bed 60, and a collapsed position shown in FIGS. 9 and 10 in which the bales are permitted to freely roll off the load bed 60 over each stake 120 and onto the ground 16. Each hydraulic cylinder 122 has a cylinder end 124 pivotally connected to a depending link on the load bed 60. A piston end 126 is pivotally attached to a link 128 swingably mounted on a cross-member 58 at the rear of load bed 60. The link 128 has a member 130 provided with a spring (not shown) so that the stake 120 will deflect upwardly when it contacts the ground 16 during the pivoting of the load bed 60.

In order to control the various hydraulic cylinders 52, 74, 76, 104, 110, 112, 122 and the hydraulic power station 40 described above, the carrier operator in the towing vehicle 12 is provided with an electric pendulum or control box (not shown) having a set of manually operable controls for selectively activating and deactivating the lifting of the gripping jaws 94, 98, the squeezing of the gripping jaws 94, 98, the raising of the upper frame 26 relative to the lower frame 24, the raising and collapsing of the bale restraining apparatus 22 and the moving of the tongue 44.

In use, the empty carrier is initially hitched to and towed directly behind the towing vehicle 12 (as shown in phantom in FIG. 2) until the carrier 10 is ready to engage, load and transport bales of harvested hay lying in the field 16. Initially, the baleless gripping jaws 94, 98 of the bale pickup and engaging structure 20 are held in an elevated position such as depicted in FIG. 1 or FIG. 6. Once the carrier is ready to handle the bales, the hydraulic cylinder 52 is actuated to swing the tongue 44 so the carrier 10 will catwalk to an offset position behind and to the left of towing vehicle 12 as shown in the solid lines of FIG. 2. With this relationship established, the carrier 10 may then be towed to place the bale pick-up and engaging structure 20 directly behind a round bale 14 so that the gripping jaws 94, 98 are generally parallel with the ends of the bale. If necessary, depending on the length of the bale, the hydraulic cylinder 104 is activated to move the gripping jaw 98 away from gripping jaw 94 so that both jaws 94, 98 are disposed outwardly adjacent the bale 14. Then, hydraulic cylinders 110, 112 are used to pivot the carriage 86 and the gripping jaws 94, 98 downwardly to a forwardly extending position shown in FIG. 5, after which hydraulic cylinder 104 is again energized to squeeze the bale 14 between the gripping jaws 94, 98. At this point, the hydraulic cylinders 110, 112 enable the lifting of the bale 14 engaged gripping jaws 94, 98 from the ground 16 to a loading position in which the bale 14 is elevated to the receiving portion 85 formed by the roll bars 84 and the forward end of the load bed 60. That is, the initial bale 14 is lifted over or upon the roll bars 84 and assumes a position shown by the clamped bale 14 in FIG. 6 still engaged by the jaws 94, 98 so that the first bale 14 will not roll backwards on the load bed 60 as the carrier 10 is transported to the next bale. The shape of the roll bars 84 prevents the first bale 14 from rolling forwardly off the load bed 60 and the railings 72, 73 prevent the initial bale 14 from rolling off the sides of the carrier 10. When it is desired to pick up another bale 14, the pick-up and engaging structure 20 is once again placed directly behind the subsequent bale, the gripping jaws 94, 98 are released to deposit the clamped initial bale 14 of the load bed 60 and the gripping jaws 94, 98 are again moved into squeezing engagement with the subsequent bales 14 (FIG. 5). Next, (as seen in FIG. 6) the subsequent bale 14 is lifted to the receiving portion 85 and, in the process, normally pushes against a forward facing portion of the initial bale 14 which is pushed rearwardly on the load bed 60. The subsequent bale 14 is then released and the preceding process is repeated until the load bed 60 is fully loaded and the initial bale 14 is in contact with the bale restraining apparatus 22 at the rear of the load bed 60. With the last bale 14 being clamped in the position shown in FIG. 6, the loaded carrier 10 is then transported to an unloading site where the load of bales 14 is dumped by activating hydraulic cylinders 74, 76 to pivot the load bed 60 about pivot 70. At this time, each hydraulic cylinder 122 is actuated to move each stake from an upright position (FIG. 8) to a collapsed position (FIG. 10) at which the bales may roll off the load bed 60.

In some instances the bale 14 to be loaded may be disposed or misshapen so that the ends of the bale 14 are not centered or aligned with the gripping jaws 94, 98. As a feature of the invention depicted in FIG. 11, this orientation problem is corrected with the alignment arrangement of the present invention by actuating the hydraulic cylinder 52 so as to slightly shift or reorient the entire wheeled carrier 10 relative to the ground surface 16 without moving the towing vehicle 12. Once the adjustment has been effected, the gripping jaws 94, 98 may be moved into engagement with the bale 14 as previously described above. Such feature is particularly attractive because the likelihood of dropping a clamped bale is significantly reduced, improving the safety and bale handling efficiency of the carrier 10.

Although the description above is preferably directed to a load of a single row of five round bales having typical diameters of 4 to 6 feet and lengths of 4 to 6½ feet, one skilled in the art would readily adapt the carrier 10 to handle different sized bales as desired.

It should be recognized that the present invention provides a bale handling carrier which is simple and economical in construction and relatively easy to use with improved safety and stability. The present invention resolves the need for a bale handling carrier which effectively aligns or centers bales to allow relatively rapid bale handling. The present invention further provides a method of handling multiple bales using only the bale pick-up and engaging structure without the need for additional loading or conveying equipment.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with following claims.

I claim:

1. A carrier adapted to be drawn over the ground for handling and transporting bales of hay, the carrier comprising:

a rigid framework assembly, adapted to be connected to a towing vehicle, for supporting a series of bales in side-to-side relationship substantially along the entire length thereof;

bale engaging structure pivotally attached to the framework assembly about a first horizontal axis for lifting the bales from the ground to the framework assembly, and slidably mounted to the framework assembly along a second horizontal axis substantially parallel to the first horizontal axis for engaging the ends of the bales; and an alignment arrangement constructed and arranged to shift the framework assembly without moving the towing vehicle so as to align the bale engaging structure with the ends of the bale before the bale engaging structure engages the bales on the ground;

wherein the framework assembly comprises a lower frame having a forward end adapted to be connected to the towing vehicle, a rearward end defining a third horizontal axis and a wheel and axle assembly on each side thereof, wherein the bale engaging structure includes a carriage having a pair of parallel, spaced apart gripping jaws, one of the gripping jaws being movably mounted relative to the other of the gripping jaws, wherein the alignment arrangement includes a tongue having one end connected to the towing vehicle and another end pivotally connected to the lower frame, a first power assembly having one end connected to the lower frame and another end connected to the tongue, a second power assembly for pivotally mounting the gripping jaws about the first horizontal axis, and a third power assembly for slidably moving one of the gripping jaws along the second horizontal axis so as to squeeze the bale from both ends for loading onto the carrier.

2. The carrier of claim 1, wherein the framework assembly further comprises an upper frame overlying the lower frame, and pivotally connected to the lower frame along the third horizontal axis, the upper frame having a forward end and a rearward end.

3. The carrier of claim 2, further including a fourth power assembly for raising and lowering the upper frame about the third horizontal axis relative to the lower frame.

4. The carrier of claim 2, wherein the bale engaging structure is pivotally attached to the forward end of the upper frame about the first horizontal axis which is substantially parallel to the third horizontal axis.

5. The carrier of claim 2, wherein the upper frame has a length longer than the length of the lower frame and an extended portion of the upper frame projects beyond the third horizontal axis.

6. The carrier of claim 1, wherein the alignment arrangement is mounted on the lower frame for shifting the upper frame and the lower frame so as to align the gripping jaws generally parallel with the ends of the bale before the gripping jaws engage the bales on the ground.

7. The carrier of claim 1, including a bale restraining apparatus mounted at the rearward end of the framework assembly.

8. In a bale carrier for picking up round bales of crop material from a field, accumulating a plurality of round bales and transporting the accumulated bales to a storage location to be unloaded from the bale carrier, the bale carrier having a mobile frame adapted to be connected to a towing vehicle for movement across the field, a load bed pivotally supported on the frame for accumulating a series of bales in side-to-side relationship thereon, and an improved bale pick-up structure mounted on the load bed for individually engaging bales of crop material lying in the field and elevating the bales onto the carrier, the load bed having a receiving portion on which the bale pick-up structure sequentially deposits bales picked up from the field, the improved bale pick-up structure comprising:

a carriage pivotally secured to the load bed and including a pair of parallel, spaced apart gripping jaws, the carriage further including a first tubular member on which one of the parallel gripping jaws is mounted, and a second tubular member telescopically mounted with respect to the first tubular member and carrying the other of the parallel gripping jaws;

a first hydraulic power system mounted between the first tubular member and the second tubular member for independently moving one of the parallel gripping jaws toward and away from the other of the parallel gripping jaws to releasably engage the ends of a bale of crop material therebetween; and a second hydraulic power system connecting the frame and the first tubular member for independently pivoting the parallel gripping jaws in substantially vertical planes to lift a bale of crop material engaged between the parallel gripping jaws from the field to a position on a receiving portion of the load bed.

9. The improved bale pick-up structure of claim 8, including a bale restraining apparatus on the load bed for selectively holding bales on the load bed.

10. The improved bale pick-up structure of claim 9, including a fifth hydraulic power system disposed on the load bed for moving the bale restraining apparatus between an upright, retaining position and a collapsed, release position.

11. The improved bale pick-up structure of claim 9, wherein the bale restraining structure comprises at least one stake pivotally mounted to a rearwardmost end of the load bed, the stake being deflectable against the surface of the field.

12. The improved bale pick-up structure of claim 8, including a pair of parallel, spaced apart guide rails extending upwardly from the load bed for restraining the ends of bales deposited on the load bed.

13. The improved bale pick-up structure of claim 8, including a bale centering arrangement associated with the frame and the load bed for aligning each of the parallel gripping jaws in parallel relationship with an end of a bale of crop material before moving the parallel gripping jaws into engagement with the ends of the bale.

14. The improved bale pick-up structure of claim 13, wherein the bale centering arrangement comprises a tongue connecting the towing vehicle with the frame, and a third hydraulic power system interconnecting the frame and the tongue for shifting the parallel gripping jaws into substantially parallel alignment with the ends of the bale.

15. The improved bale pick-up structure of claim 8, including a fourth hydraulic power system extending between the frame and the load bed for pivoting the load bed relative to the frame so as to dump the bales on the load bed back onto the field.

16. A method of using a bale carrier for picking up round bales of crop material from a field, accumulating a plurality of round bales and transporting the accumulated bales to a storage location to be unloaded from the bale carrier, the bale carrier having a mobile frame adapted to be connected to a towing vehicle for movement across a field, bale pick-up structure mounted on the frame for individually engaging bales of crop material lying in the field and elevating the bales onto the carrier, a load bed pivotally supported on the frame for accumulating a series of bales in side-to-side relationship thereon, the load bed having a receiving portion on which the bale pick-up structure sequentially deposits bales picked up from the field, and a bale restraining apparatus for maintaining loaded bales on the load bed, the method comprising the steps of:

a) providing the bale pick-up structure with a carriage rotatably secured to the load bed and including a pair of parallel, spaced apart gripping jaws engageable with the sides of a bale, one of the gripping jaws being movable and maintained in parallel relationship towards and away from the other of the gripping jaws so as to squeeze the bale therebetween;

b) moving the carrier to align an initial bale between the parallel gripping jaws;

c) rotating the carriage to position the parallel gripping jaws alongside the ends of the initial bale;

d) moving one of the parallel gripping jaws towards the other of the parallel gripping jaws to squeeze the initial bale therebetween;

e) rotating the carrier to lift the initial bale engaged between the parallel gripping laws from the field to the receiving portion of the load bed;

f) further moving the carrier to align a subsequent bale between the parallel gripping jaws;

g) moving the parallel gripping jaws apart to release the initial bale onto the load bed;

h) rotating the carriage from the load bed to the field to place the parallel gripping jaws alongside the sides of the subsequent bale;

i) moving the parallel gripping arms together to engage the subsequent bale therebetween;

j) rotating the carriage to lift the subsequent bale engaged between the parallel gripping jaws from the field against a forward facing portion of the initial bale which is pushed rearwardly on the load bed until the subsequent bale is positioned over the receiving portion of the load bed; and k) repeating steps a) through j) for subsequent bales in the field until the initial bale contacts the bale restraining apparatus on the load bed;

wherein the steps of aligning the initial and subsequent bales between the parallel gripping jaws include the step of shifting the frame and the load bed without moving the towing vehicle so as to initially align the parallel gripping jaws with the ends of the bales before the parallel gripping jaws engage the bales.

17. The method of claim 16, further including the steps of:

l) disengaging the bale restraining apparatus from the initial bale; and m) pivoting the load bed upon the frame so as to unload the bales deposited on the load bed.

* * * * *